(12) United States Patent
Lele et al.

(10) Patent No.: US 6,239,252 B1
(45) Date of Patent: May 29, 2001

(54) SINGLE STEP PROCESS FOR THE PREPARATION OF POLY (OXYALKYLENE)-ALPHA, OMEGA-DICARBOXYLIC ACID

(75) Inventors: Bhalchandra Shripad Lele; Mohan Gopalkrishna Kulkarni, both of Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/477,263

(22) Filed: Jan. 4, 2000

(51) Int. Cl.[7] .............................. C08G 65/34; C07C 51/16
(52) U.S. Cl. ...................... 528/425; 562/401; 562/407; 562/418; 562/509; 562/512; 562/538; 562/590; 562/859; 524/714; 524/725; 524/765; 524/770; 524/878
(58) Field of Search .................................. 562/401, 407, 562/418, 509, 512, 538, 590, 859; 524/714, 725, 765, 770, 878; 528/425

(56) References Cited

U.S. PATENT DOCUMENTS 5,256,819 * 10/1993 Fried ...................................... 562/537
5,605,976 * 2/1997 Martinez et al. ..................... 525/408

FOREIGN PATENT DOCUMENTS

96/19514 * 6/1996 (WO).

* cited by examiner

*Primary Examiner*—Samuel A. Acquah
(74) *Attorney, Agent, or Firm*—Merchant & Gould P.C.

(57) ABSTRACT

The invention relates to single step process for the preparation of poly (oxyalkylene)-alpha, omega-dicarboxylic acids of the formula $HO_2CCH_2O(CH_2CHRO)_nCH_2CO_2H$, wherein R is hydrogen, methyl or mixtures of hydrogen and methyl on the individual molecule and n is an integer of from 100 to 2500, comprising the steps of reacting, an oxidising agent such as poly (oxyalkylene glycol) with Jone's reagent in a polar solvent at a temperature in the range of 10° C. to room temperature for a period ranging between 1 hour to 12 hours, quenching the reaction by adding free radical scavanger, removing oxidation by-products from reaction mixture by adsorbing them on an adsorbing agent to obtain dicarboxylic acids in the solution, and evaporating the clear solution to obtain poly (oxyalkylene)-alpha, omega-dicarboxylic acids.

13 Claims, No Drawings

SINGLE STEP PROCESS FOR THE PREPARATION OF POLY (OXYALKYLENE)-ALPHA, OMEGA-DICARBOXYLIC ACID

FIELD

This invention relates to a single step process for the preparation of poly (oxyalkylene)-alpha, omega-dicarboxylic acids having formula $HO_2CCH_2O(CH_2CHRO)_nCH_2CO_2H$, wherein R is hydrogen, methyl or mixtures of hydrogen and methyl on the individual molecule and n is an integer from 100 to about 2500. More particularly, the invention relates to a process for the preparation of poly (oxyalkylene)-alpha, omega-dicarboxylic acids by oxidation of corresponding poly (oxyalkylene glycol)s in the presence of an oxidizing agent.

BACKGROUND

Poly (oxyalkylene)-alpha, omega-dicarboxylic acids are finding ever increasing applications in various branches of chemistry. Some of the applications are as follows:
1. Water soluble support for Merrifield type peptide synthesis (R. P. Garfield and G. M. Ananthramaiah, J. Am. Chem. Soc. 101, 3394 (1979), G. P. Royer, Methods Enzymol. 136, 302 (1987)).
2. Polymeric drug carriers—prodrugs (K. Ulbrich and J. Kopecek, Macromol. Chem. 187, 1131 (1986), T. Ouchi, Y. Hogihara, K. Takashashi, Y. Takano and I. Igarashi, Drug Design and Discovery, 9, 93 (1992), R. B. Greenwald, C. W. Gilbert, A. Pendri, C. D. Conover, J. Xia and A. Maertinez, J. Med. Chem. 39, 424 (1996), S. Zalipski, C. Gilon and A. Zilkha, Eur. Polym. J. 19, 1177 (1983), M. Pecher, J. Strochalm and K. Ulbrich, Makromol. Chem. Phys. 198, 1009 (1997)).
3. Antistatic agents in polyamide/s (I. Jan and C. Frantisek, Czech. CS. 234,832).
4. Conjugates with enzyme-metal ion for improved stability and activity of enzymes (Y. Tukayuki, M. Takeshi, T. Katsunobu, S. Yuji, T. Yukata and I. Yuji, Biochem. Biophys. Res. Commun. 145, 908 (1987), N. Veyarma, M. Nakata and A. Nakamura, Polym. J. (Tokkyo) 17, 721 (1985), T. Katsunobu, O. Kimiko, Y. Takayuki, S. Yuji, K. Yoh, M. Ayako and I. Yuji, J. Biotechnol 8, 135 (1988)).
5. Conjugates with hemoglobin for oxygen carrying blood substitute (A. Yabuki, K. Yamaji, H. Ohki and Y. Iwashita, Transfusion (Philadelphia) 30,516 (1990).
6. Conjugates with lipids for improved longevity in blood circulation (3. Gabriel and C. Greger, Biochem. Biophys. Acta. 1146, 157 (1993).
7. Surface modyfying agents for transition metal alluminides (D. M. Zehner, Surf. Rev. Lett. 3, 1637 (1996).
8. Stabilizer for water based epoxy formulations (H. E. Friend and C. J. Stark, PCT Intl. Appl. WO 9619, 514) and so on.

In order to meet these growing requirements for poly (oxyalkylene)-alpha, omega-dicarboxylic acids, various methods for their preparation have been developed so far which can broadly be classified into following two types.
1. Carboxymethylation of poly (oxyalkylene glycol)s.

In this method of preparation, terminal hydroxymethyl groups of poly (oxyalkylene glycol)s are derivatized with carboxymethyl groups ($-CH_2-COOH$ groups) so as to obtain poly (oxyalkylene)-alpha, omega-dicarboxylic acids. This method essentially involves following steps: A) Activation of terminal hydroxyl groups by reacting poly (oxyalkylene glycol)s with strong bases such as potassium tertiary butoxide, silver oxide, sodium hydroxide etc. B) Reaction of alcoholate so obtained with reagents like bromo ethyl acetate, chloroethyl acetate etc. C) Saponification of ethyl ester followed by acidification of reaction mixture. D) Isolation of product.

PRIOR ART REFERENCES

The above method has been used by various researchers (R. P. Garfield and G. M. Anantharamaiah, J. Am. Chem. Soc. 101, 3394 (1979), K. Ulbrich, J. Strohalm and J. Kopecek, Makromol. Chem. 187, 1131 (1986), M. Pecher, J. Strohalm and K. Ulbrich, Makromol, Chem. Phys. 198, 1009 (1997), A. F. Buckmann, M. Morr and J. Goete, Makromol. Chem 183, 1379 (1981), I. Keji, I. Yuji and O. Taketashi, Eur. Pat. Appl. EP. 206, 448, A. J. Martinez and R. B. Greenwald, U.S. U.S. Pat. No. 5,605,976A). Since this method of preparation for poly (oxyalkylene)-alpha, omega-dicarboxylic acids is a multistep process involving speciality reagents, it is not attractive for large scale production.
2. Oxidation of Poly (oxyalkylene glycol)s.

A number of patents which are based on this technique have been filed. Japanese patent, Japan Kokai 7300,528 discloses the preparation of low molecular weight poly (oxyethylene)-alpha,omega-dicarboxylic acids by oxidation of poly (ethylene glycol)s using oxygen and concentrated nitric acid as oxidizing agent in an autoclave at 80° C. under 3 Kg/cm$^2$ pressure (E. Yonemitsue, T. Icshiki, Y. Kijima and T. Matsumoto, Japan Kokai 7300,528). Low molecular weight poly (ethylene glycol)s have also been oxidized using Platinum/charcoal catalysts and oxygen under pressure at 50° C. in a column reactor (Sanyo Chemical Industries Ltd. Jpn. Kokai Tokyo Koho JP 8258,642). Preparation of poly (oxyethylene)-alpha, omega-dicarboxylic acids by oxidation of poly (ethylene glycol)s in presence of cobalt acetate quadrahydrate, using oxygen under pressure at 140° C. and using a mixture of catalysts viz. Copper acetate, ammonium venadate, nitric acid and formaldehyde at 50 to 90° C. has also been reported (Nikka Chemical Industry Co. Ltd. Jpn. Kokai Tokyo Koho JP 5901,443 and W. Disteldorf, W. Eisfeld and H. Hellbach, Gen. Offen. DE. 3,209, 434, respectively).

Czechoslovakian patent CS. 234,832 discloses the preparation of poly (oxyethylene)-alpha, omega-dicarboxylic acids of molecular weights in the range of 1000 to 3000 by oxidation of corresponding poly (ethylene glycol)s using potassium dichromate and sulfuric acid at 70° C. (I. Jan and C. Frantisek, Czech. Cs. 234, 832). Microbial oxidation of poly (ethylene glycol)s of molecular weights from 200 to 2000 by Rhinocladiella actrovirens has been reported, wherein, the time period required for oxidation was up to 14 days (M. Shuichi, Y. Nobuo and Y.Sadao, Makromol. Chem. Rapid. Commun. 10, 63 (1989)). Recently, U.S. Pat. No. 5,256,819 has disclosed preparation of poly (oxyalkylene)-alpha, omega-dicarboxylic acids of wide range of molecular weights by oxidation of corresponding poly (oxyalkylene glycol)s using oxygen, nitric acid and 2,2,6,6 tetramethylpiperidine-1-oxyl as oxidizing agent (H. E. Fried U.S. Pat. No. 5,256,819).

Most of the above cited oxidation processes require either harsh reaction conditions such as high temperature, pressure etc. or special reagents like stable free radicals-2,2,6,6 tetramethylpiperidine-1-oxyl. Also, in most cases conventional work up procedures which involve neutralization of oxidizing agents, concentration of solvents, removal of oxidation by-products and isolation of products, are followed. Thus, there is a need to develop and simpler method for oxidation of poly (oxyalkylene glycol)s having wide range of molecular weights to corresponding dicarboxylic acids.

OBJECTS

It is therefore an object of the present invention to provide a single step process for the preparation of poly (oxyalkylene)-alpha, omega-dicarboxylic acids of low to very high molecular weights in high yields by oxidation of corresponding glycols using commonly available oxidizing agents under mild reaction conditions such as room temperature, atmospheric pressure etc.

Another object is to provide a simpler method for removing the oxidation by-products from reaction mixture and thus obviate the drawbacks in conventional work up procedures.

As compared to various oxidizing agents used in the prior art processes, Jone's reagent, which is a mixture of chromium trioxide and sulfuric acid and water is, a strong oxidizing agent which oxidizes hydroxymethyl groups to carboxyl groups at temperatures in the range of 10° C. to room temperature (25° C.) (L. S. Loeffler, S. F. Britcher and W. Bauumgarten, J. Med. Chem. 13, 926 (1970). Despite such strong oxidizing power, Jone's reagent has not been used in oxidation of poly (oxyalkylene glycol)s to corresponding dicarboxylic acids.

SUMMARY

This invention uses Jone's reagent to achieve the objects of the present invention. It has now been found that poly (oxyalkylene)-alpha, omega-dicarboxylic acids can be produced in high yields by oxidation of poly (oxyalkylene glycol)s using Jone's reagent as oxidizing agent in suitable solvent at room temperature.

DETAILED DESCRIPTION

Accordingly, the present invention provides a single step process for the preparation of poly (oxyalkylene)-alpha, omega-dicarboxylic acids of the formula $HO_2CCH_2O(CH_2CHRO)_nCH_2CO_2H$, wherein R is hydrogen, methyl or mixtures of hydrogen and methyl on the individual molecule and n is an integer from 100 to 2500, which process comprises the steps of (i) reacting a poly (oxyalkylene glycol) corresponding to a poly (oxyalkylene)-alpha, omega-dicarboxylic acid with Jone's reagent as an oxidizing agent in a polar solvent at a temperature in the range of 10° C. to room temperature for a period ranging between 1 hour to 12 hours, (ii)quenching the reaction by adding free radical scavenger, (iii) by removing oxidation by-products from reaction mixture by adsorbing them on an adsorbing agent to obtain dicarboxylic acids in the solution, and (iv) evaporating the clear solution to obtain poly(oxyalkylene)-alpha, omega-dicarboxylic acids.

In an embodiment, the poly(oxyalkylene glycol)s are selected from the group of compound having the formula $HOCH_2O(CH_2CHRO)_nCH_2OH$ wherein R is hydrogen, methyl or mixtures of hydrogen and methyl on the individual molecule and n is an integer which represents the average number of oxyalkylene groups, preferably from 100 to 2500.

In another embodiment, the oxidizing agent is Jone's reagent comprising chromium trioxide and sulfuric acid dissolved in water or aqueous water solution of chromium trioxide and sulfuric acid in the molar proportion of 1:1 to 1: 1: 1.75 respectively or a combination of two separate components i.e. water solution of chromium trioxide and concentrated sulfuric acid.

In yet another embodiment, the poly (oxyalkylene glycol)s are selected from commercially available poly (ethylene glycol)s of molecular weights 4000, 6000, 20,000, 1,00,000 and monomethoxy poly (ethylene glycol) of molecular weight 5000.

In yet another embodiment, the free radical scavenger is selected from isopropyl alcohol, and mercaptoethanol.

In still another embodiment, the solvent is selected from acetonitrile, dichloromethane, chloroform, acetone, tetrahydrofuran, dioxane and cyclohexanone.

In another embodiment, the weight ratio of poly (oxyalkylene glycol) to solvent is in the range from about 1:5 to 1:200, more preferably in the range from about 1:10 to 1:100.

In another embodiment, the adsorbing agents are selected from Fuller's Earth, Kiesleger, ion exchange resins, activated charcoal.

Still another embodiment, the adsorbing agent required for efficient adsorption of chromium salts from reaction mixture is typically in the range of about 10% to 30% of the weight of poly (oxyalkylene glycol) taken for the reaction. Adsorption process typically requires to 3 hours stirring of reaction mixture after adsorbing agent is added in the reaction mixture.

Subsequently, the reaction mixture is filtered to obtain clear and colorless solution which is then evaporated in vacuo to obtain products.

In another feature in order to oxidize one mole of hydroxymethyl groups, the amount of Jone's reagent used contains 1 mole chromium trioxide and 1.75 moles sulfuric acid, dissolved in water.

In yet another feature the process of the present invention is typically conducted under mild conditions. Poly (oxyalkylene glycol) is dissolved in suitable solvent and the appropriate amount of Jone's reagent is added to it and the reaction mixture is stirred at room temperature for a period of about 1 hour to 12 hours. After stirring the reaction mixture for the above mentioned time period, the reaction is quenched by adding isopropyl alcohol as free radical scavenger. Blue green colored chromium salts are formed in the reaction mixture as result of oxidation. These salts form a fine suspension which is difficult to separate from the reaction mixture by conventional filtration, especially in the case of high molecular weight poly (oxyalkylene glycols). Thus, in order to remove these oxidation by-products the process of the instant invention uses the method of adsorption of the salts from reaction mixture onto an adsorbing agent.

In another feature of the present invention, the adsorption process conditions vary depending upon the molecular weight of poly (oxyalkylene)-alpha, omega-dicarboxylic acid prepared by the process of the instant invention, e.g. for poly (oxyalkylene)-alpha,omega-dicarboxylic acids of molecular weights 4000 and 6000, a large fraction of chromium salts can be filtered out of reaction mixture, rendering less amount of adsorbing agent to be used for the treatment. But in case of poly (oxyalkylene)-alpha, omega-dicarboxylic acids of molecular weights 20,000 and 1,00,000, chromium salts are formed after the reaction of fine suspension which is practically inseparable and thus requires the above mentioned adsorption process for its removal.

The ranges and limitations provided in the instant specification and claims are those which are believed to particularly point out and distinctly claim the present invention. It is however understood that other ranges and limitations which perform substantially the same function in the same or substantially the same manner to obtain the same or substantially the same results are intended to be within the scope of the instant invention as defined by the instant specification and claims.

The process of the instant invention will be further described by the following examples which are provided for illustration and are not to be construed as limiting the invention.

EXAMPLE-1

Preparation of oxidizing agent (jone's reagent)

Jone's reagent was synthesized according to the following procedure 70 g $CrO_3$ was dissolved in 500 ml distilled water and the solution was stirred with magnetic needle at 10° C. to 15° C. (ice—water bath). To this solution, 61 ml conc. $H_2SO4$ was added in small portions. After the addition was over, the solution was stirred for additional 10 minutes and allowed to come to room temperature, Jone's reagent so prepared was stored at room temperature and used in syntheses of all poly (oxyalklene)-alpha, omega-dicarboxylic acids.

EXAMPLE-2

Preparation of poly (oxyethylene) 4000-alpha, omega-dicarboxylic acid: 40 g poly (ethylene glycol) 4000 (0.01 M) was taken in a 1 liter capacity round bottom flask and 400 ml acetone was added to it. Contents of the flask were heated in a heating mantle to obtain clear, homogeneous solution. The solution was allowed to attain room temperature. To this solution, 17 ml Jone's reagent (containing 0.02 M chromium trioxide) was added in a single portion and the reaction mixture was stirred at room temperature ((~25° C.) with magnetic needle. Within few minutes after the addition, blue-green colored chromium salts (oxidation by-products) precipitated out in the form of a fine suspension in acetone solution. Stirring of the reaction mixture was continued overnight (12 hrs). Then the reaction was quenched by adding 5 ml isopropyl alcohol (free radical scavenger). To the above suspension of chromium salts (not separable by filtration), 4 g finely powdered activated charcoal (10% of the wt. of poly (ethylene glycol) 4000 was added and stirred with magnetic needle for two hours.

This was then filtered on Buckner funnel to obtain colorless, clear acetone solution. Clear acetone solution was concentrated in vacuo to a viscous liquid. This was poured in petri-dish and allowed to cool to room temperature at which it solidified. Residual moisture from the product so obtained was removed by drying it in vacuum desiccator for 48 hours. The product was obtained in the form of a white powder.

Oxidation of hydroxymethyl groups to carboxyl groups was quantified by estimating acid values of all the products. The results are listed in Table 1.

EXAMPLE-3

Preparation of monomethoxy poly (oxyethylene) 5000-monocarboxylic acid: 50 g monomethoxy poly (ethylene glycol) 5000 (0.01 M) was dissolved in 400 ml acetone as mentioned in the example 1. To this solution, 8.5 ml Jone's reagent (containing 0.01 M chromium trioxide) was added in a single portion and the reaction mixture was stirred with magnetic needle overnight at room temperature. Then the reaction was quenched by adding 5 ml isopropyl alcohol. Chromium salts formed were removed from reaction mixture by adding 5 g finely powdered activated charcoal (10% of the wt. of monomethoxy poly (polyethylene glycol) 5000), stirring for two hours and filtering it to obtain colorless acetone solution. The solution was concentrated in vacuo and white powdered product was isolated as mentioned in example 1.

EXAMPLE-4

Preparation of poly (oxyethylene) 6000-alpha,omega-dicarboxylic acid: 60 g poly (ethylene glycol) 6000 (0.01 M) was dissolved in 400 ml acetone. To this solution, 17 ml Jone's reagent (containing 0.02 M chromium trioxide) was added in a single portion and the reaction mixture was stirred with magnetic needle overnight at room temperature. Then the reaction was quenched by adding 5 ml isopropyl alcohol. Chromium salts formed were removed from reaction mixture by adding 6 g finely powdered activated charcoal (10% of the wt. of poly (ethylene glycol) 6000), stirring for two hours and filtering it to obtain colorless acetone solution. The solution was concentrated in vacuo and white powdered product was isolated as mentioned in example 1.

EXAMPLE-5

Preparation of poly (oxyethylene) 20000-alpha,omega-dicarboxylic acid: 200 g poly (ethylene glycol) 20000 (0.01 M) was dissolved in 800 ml acetone. To this solution, 17 ml Jone's reagent (containing 0.02 M chromium trioxide) was added in a single portion and the reaction mixture was stirred with magnetic needle overnight at room temperature. Then the reaction was quenched by adding 5 ml isopropyl alcohol. Chromium salts formed were removed from reaction mixture by adding 20 g finely powdered activated charcoal (10% of the wt. of poly (ethylene glycol) 20000), stirring for two hours and filtering it to obtain colorless acetone solution. The solution was concentrated in vacuo and white powdered product was isolated as mentioned in example 1.

EXAMPLE-6

Preparation of poly (oxyethylene) 1,00,000-alpha,omega-dicarboxylic acid: 50 g poly (ethylene glycol) 1,00,000 (0.5 milimoles) was dissolved in 1000 ml acetone. To this solution, 1 ml Jone's reagent (containing 1.0 milimole chromium trioxide) was added in a single portion and the reaction mixture was stirred with magnetic needle overnight at room temperature. Then the reaction was quenched by adding 5 ml isopropyl alcohol. Chromium salts formed were removed from reaction mixture by adding 5 g finely powdered activated charcoal (10% of the wt. of poly (ethylene glycol) 1,00,000), stirring for two hours and filtering it to obtain colorless acetone solution. The solution was concentrated in vacuo and white powdered product was isolated as mentioned in example 1.

EXAMPLE-7

Preparation of poly (oxyethylene) 1,00,000-alpha,omega-dicarboxylic acid: 50 g poly (ethylene glycol) 1,00,000 (0.5 milimoles) was dissolved in 1000 ml acetone. To this solution, 1 ml Jone's reagent (containing 1.0 milimole chromium trioxide) was added in a single portion and the reaction mixture was stirred with magnetic needle overnight at room temperature. Then the reaction was quenched by adding 5 ml isopropyl alcohol. Chromium salts formed were removed from reaction mixture by adding 5 g finely powdered activated charcoal (10% of the wt. of poly (ethylene glycol) 1,00,000), stirring for two hours and filtering it to obtain colorless acetone solution. The solution was concentrated in vacuo and white powdered product was isolated as mentioned in example I

TABLE 1

Data for oxidation of poly (oxyalkylene glycol)s to poly (oxyalkylene)- alpha, omega- dicarboxylic acids by Jone's reagent.

| No | Example No | Acid value, milimoles of carboxyl grs/g, (found) | Acid value, milimoles of carboxyl grs/g, (theoretical) | Percentage Yield |
|---|---|---|---|---|
| 1 | Example 1 | 0.53 | 0.49 | 82 |
| 2 | Example 2 | 0.16 | 0.19 | 88 |
| 3 | Example 3 | 0.42 | 0.33 | 88 |
| 4 | Example 4 | 0.24 | 0.1 | 61 |
| 5 | Example 5 | 0.05 | 0.02 | 74 |

(Theoretical acid values are calculated assuming that poly (oxyalkylene glycol)s used are monodisperse. e.g. molecular weight of poly (ethylene glycol) 6000 was assumed to be 6000 which is in fact in the range of 6000 to 7500).

Advantages of the Present Invention are:
(1) The process of the present invention allows the oxidation of low to very high molecular weight poly (oxyalkylene glycols) under very mild conditions i.e. at room temperature and atmospheric pressure, unlike high temperature and pressure used in the conventional processes.
2. The process of the present invention uses easily available and inexpensive oxidizing agent.
3. The process of the present invention provides a simple work up procedure to isolate the products as compared to tedious conventional work up procedures.

What is claimed is:
1. A single step process for the preparation of poly (oxyalkylene)-alpha, omega-dicarboxylic acids of the formula $HO_2CCH_2O(CH_2CHRO)_nCH_2CO_2H$, wherein R is hydrogen, methyl or mixtures of hydrogen and methyl on the individual molecule an n is an integer from 100 to 2500, comprising the steps of:
 (i) reacting poly (oxyalkylene glycol) with Jones' reagent in a polar solvent at a temperature in the range of 10° C. to room temperature for a period ranging between 1 hour to 12 hours,
 (ii) quenching the reaction by adding a free radical scavenger,
 (iii) removing oxidation by-products from reaction mixture by adsorbing them on an adsorbing agent to obtain dicarboxylic acids in the solution, and
 (iii) evaporating the clear solution to obtain poly (oxyalkylene)-alpha, omega-dicarboxylic acids.

2. A process as claimed in claim 1, wherein the poly (oxyalkylene glycols) are selected from the group consisting of compounds having the formula $HOCH_2O(CH_2CHRO)_nCH_2OH$ wherein R is a hydrogen, methyl or mixtures of hydrogen and methyl on the individual molecule and n is an integer ranging from 100 to 2500 representing the average number of oxyalkylene groups.

3. A process as claimed in claim 1, wherein the free radical scavenger is selected from the group consisting of isopropyl alcohol and mercaptoethanol.

4. A process as claimed in claim 1 wherein, the solvent is selected from the group consisting of acetonitrile, dichloromethane, chloroform, benzene, acetone, tetrahydrofuran, dioxane, cyclohexanone.

5. A process as claimed in claim 1 wherein, the weight ratio of poly (oxyalkylene glycol) to solvent ranges from about 1:5 to 1:200.

6. A process as claimed in claim 5, wherein the weight ratio of poly (oxyalkylene glycol) to solvent ranges from about 1:5 to 1:200.

7. A process as claimed in claim 1, wherein the adsorbing agents are selected from the group consisting of Fuller's Earth, Kiesleger, ion-exchange resins, and activated charcoal.

8. A process as claimed in claim 1 wherein the amount of adsorbing agent is in the range of about 10–30% of the weight of poly (oxy-alkylene glycol).

9. A process as claimed in claim 1, wherein Jones' reagent comprises 1 mole chromium trioxide and 1.75 moles sulfuric acid, dissolved in water.

10. The process of claim 1, wherein the poly(oxyalkylene glycol) is selected from the group consisting of a polyethylene glycol and a monomethoxy poly (ethylene glycol).

11. The process of claim 10, wherein the polyethylene glycol has a molecular weight selected from the group consisting of 4000, 6000, 20000, and 100000.

12. The process of claim 10, wherein the monomethoxy poly(ethylene glycol has a molecular weight of 5000.

13. The process of claim 1, wherein said Jones' reagent has a composition selected from the group consisting of an aqueous solution of chromium trioxide and sulfuric acid in a molar proportion of 1:1 to 1.75, chromium trioxide and sulfuric acid dissolved in water, and a combination of aqueous solutions of sulfuric acid and chromium trioxide.

* * * * *